June 28, 1932.  C. C. FARMER  1,865,093
FLUID PRESSURE BRAKE AND SIGNAL SYSTEM
Filed June 1, 1929
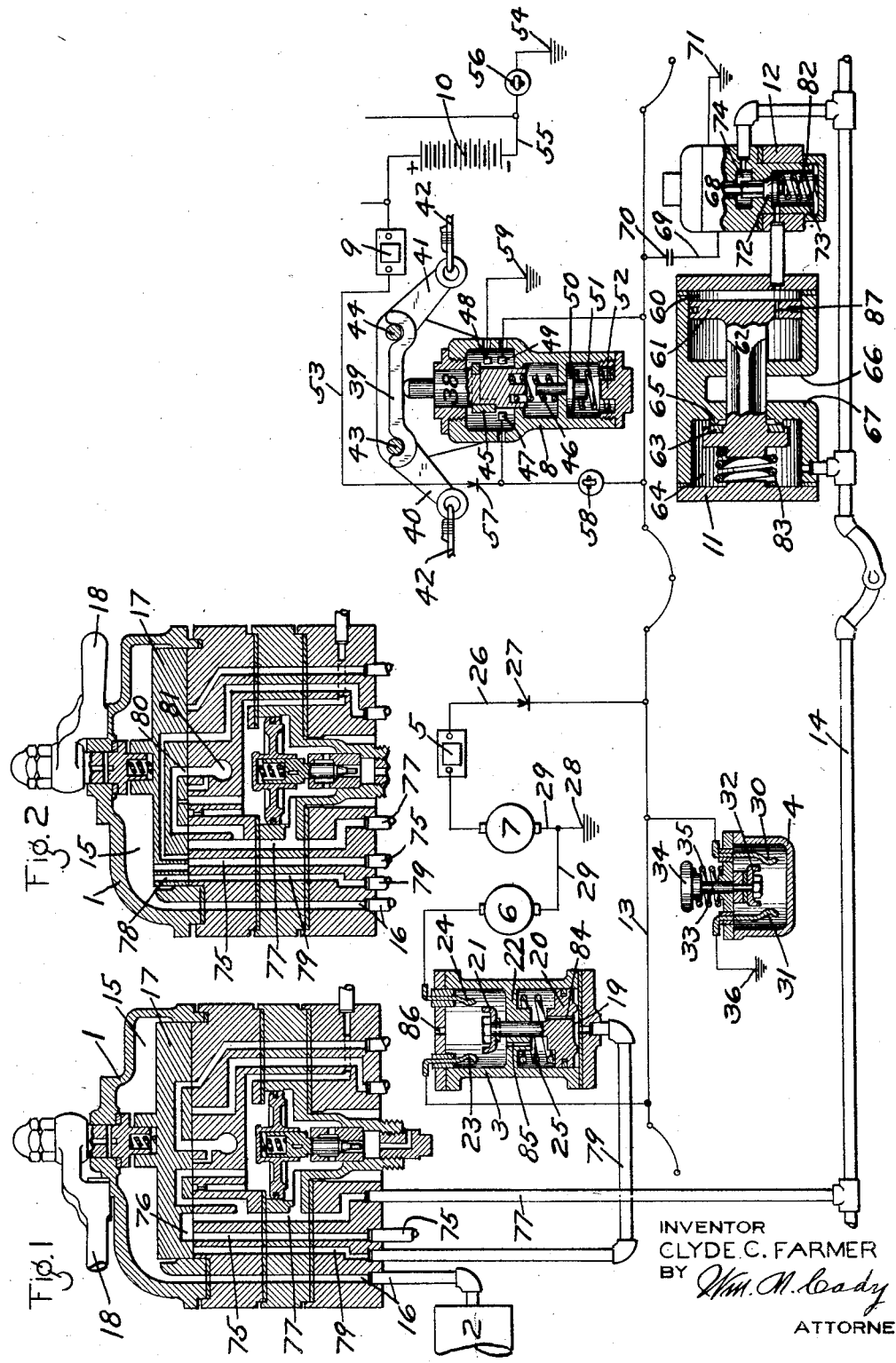
INVENTOR
CLYDE C. FARMER
BY
Wm. M. Cady
ATTORNEY Patented June 28, 1932

1,865,093

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE AND SIGNAL SYSTEM

Application filed June 1, 1929. Serial No. 367,791.

This invention relates to a combined fluid pressure brake and signal system which is controlled electrically and which is of the same general type as the system described and claimed in another of my applications for United States Letters Patent for Fluid Pressure Brake and Signal System, filed May 27, 1929, Serial No. 366,121.

In the above referred to application, direct electric current is employed for operating the signals on the train and direct current of higher potential for operating a magnet valve device to control the local venting of the brake pipe in effecting an emergency application of the brakes. With this arrangement the resistance of the magnet of the magnet valve device must be great enough to prevent the energization of said magnet when current is supplied for operating the signal devices. When each car of a train is equipped with a magnet valve device, the combined resistance offered by the magnets of all of the magnet valve devices will be such that a very high voltage must be provided to energize said magnets to insure the proper operation of the brakes in effecting an emergency application.

The principal object of my invention is to provide a combined fluid pressure brake and signal system which is controlled electrically by direct current and alternating current and in which the resistance of the emergency magnet may be such that the voltage required to energize the magnets of the magnet valve devices throughout the length of the train may be kept to a minimum.

Another object of my invention is to provide a combined fluid pressure brake and signal system in which means controlled by alternating electric current are employed for controlling the local venting of fluid under pressure from the brake pipe in effecting an emergency application of the brakes and in which means controlled by direct electric current is employed for signaling on the train.

Other objects and advantages will appear in the following more detailed description of the invention.

In the accompanying drawing; Figure 1 is a diagrammatic view, mainly in section, of a combined fluid pressure brake and signal system embodying my invention, the brake valve device being shown in running position; and Fig. 2 is a diagrammatic sectional view of the brake valve device in emergency position.

As shown in Fig. 1 of the accompanying drawing, the combined brake and signal system for the locomotive of a train may comprise a brake valve device 1, a main reservoir 2, a pneumatically operative emergency switch device 3, a signal switch device 4, an engineman's signal indicating device 5, and electric current supply sources 6 and 7, the source 6 being a generator for generating alternating current and the source 7 being a generator for generating direct current.

The equipment on each of the cars of the train may comprise a trainman's switch device 8, a signal indicating device 9, an electric current supply source 10 in the form of a battery for supplying direct current, a brake pipe vent valve device 11 and a magnet valve device 12.

Extending continuously throughout the length of the train is a single train wire 13 and also the usual brake pipe 14, said train wire and brake pipe being connected, between the vehicles, in the usual manner.

The brake valve device 1 may comprise a casing having a chamber 15 connected to the main reservoir 2 through a pipe and passage 16 and contains a rotary valve 17 which is adapted to be operated by a handle 18.

The emergency switch device 3 may comprise a casing having a chamber 19 containing a piston 20 having a stem which extends through and is slidably guided in a wall 22 of the casing. Secured to the upper end of the stem is a connector 21 which is adapted to engage with switch contact terminals 23 and 24 mounted in insulators secured to the casing. Interposed between and engaging the piston 20 and wall 22 of the casing is a spring 25.

The signal indicating device 5 may be of the buzzer type and has one of its terminals connected to the train wire 13 by a wire 26 in which there is interposed a rectifier 27 adapted to permit current to flow therethrough only in the direction of the arrow. The other terminal of the signal indicating device is connected to the positive terminal of the direct current generator 7. The negative terminal of the generator 7 is connected to ground at 28 by a wire 29.

The engineman's switch device 4 may comprise a casing having contact terminals 30 and 31 mounted therein which are adapted to be engaged by a connector 32 secured to a plunger 33 which is adapted to be operated in one direction through the medium of a foot button 34 and in the opposite direction by the pressure of a spring 35 interposed between the foot button and the casing. The contact terminal 30 is connected to the train wire 13 and the terminal 31 is connected to ground at 36.

The negative terminal of the alternating current generator is connected to the ground 28 by the wire 29 and the positive terminal is connected to the emergency switch contact terminal 24, the contact terminal 23 being connected to the train wire 13.

The trainman's switch device on each car of the train may comprise a casing which contains a sliding contact member 38 adapted to be operated by a lever 39 having operating arms 40 and 41, each having an operating cord 42 connected thereto. Mounted on the casing are fulcrum pins 43 and 44, which are so disposed that when the arm 40 is operated, the lever 39 turns about the fulcrum pin 43 to operate the member 38 and when the arm 41 is operated, the lever turns about the fulcrum pin 44 to operate said member.

The contact member 38 is provided with a contact 45 and is normally maintained in the position shown in Fig. 1 by the pressure of a spring 46. Arranged within the casing are contact terminals 47, 48 and 49, the contact 45 being adapted, at one time, to connect the contact terminals 47 and 48 and, at another time, to connect the contact terminals 47 and 49. When the member 38 is moved downwardly from its normal position to the position in which the contact 45 engages the contact terminals 47 and 48, the lower end of the member engages the upper end of a stop 50 which is slidably mounted in the casing and which is subject to the pressure of a spring 51. Further downward movement of the member 38 is now resisted by the pressure of the spring 51, and when the contact 45 connects the contact terminals 47 and 49, the stop 50 will come to rest against a stop 52 rigid with the casing.

The signal indicating device 9 may be of the buzzer type having one of its terminals connected to the train wire 13 by a wire 53 and its other terminal connected to the positive terminal of the battery 10. The negative terminal of the battery 10 is connected to ground at 54 by a wire 55 in which there is interposed a switch device 56. Interposed in the wire 53 is a rectifier 57, which permits current to flow therethrough only in the direction indicated by the arrow, and also interposed in this wire at a point between the train wire 13 and the rectifier 57 is a switch device 58.

The contact terminal 47 of the switch device 8 is connected to the wire 53 at a point between the rectifier 57 and the switch device 58. The contact terminal 48 is connected to the ground at 59 and the contact terminal 49 is connected to the train wire 13.

The vent valve device 11 may comprise a casing having a chamber 60 containing a piston 61 having a fluted stem 62 which is provided with a valve 63 contained in a chamber 64 connected to the brake pipe 14, said valve being adapted to seal against a seat ring 65 formed in the casing. The fluted stem 62 extends through openings in the spaced walls 66 and 67 of the casing, the space between the walls being open to atmosphere.

The magnet valve device 12 comprises a magnet 68, having one of its terminals connected to the train wire 13 by a wire 69 which has interposed therein a condenser 70, which is adapted to prevent the flow of direct current through the magnet 68. The other terminal of the magnet is connected to the ground at 71. This valve device also comprises a valve 72 contained in a chamber 73 which is connected to the piston chamber 60 in the vent valve device 11, said valve being operative to control communication from a chamber 74 to the chamber 73, said chamber 74 being connected to the brake pipe.

With the brake valve device 1 in running position, as shown in Fig. 1, the brake pipe 14 is supplied with fluid under pressure from the usual feed valve device (not shown) through a pipe and passage 75, a cavity 76 in the rotary valve 17 of the brake valve device, and a passage and pipe 77. Fluid thus supplied to the brake pipe 14 flows to the valve chamber 64 in the vent valve device 11 and to the chamber 74 in the magnet valve device 12.

Assuming the switch devices 56 and 58 to be in their circuit closing positions, and the engineman desires to signal the trainman, the engineman depresses the foot button 34 of the switch device 4 a sufficient distance that the connector 32 connects the contact terminals 30 and 31, thus grounding the train wire 13 so that current from the battery 10 will flow through the signal indicating device 9 and cause said device to operate to sound the signal initiated by the engineman. Since the train wire is grounded, current generated by the generator 7 will flow through the signal indicating device 5 on the locomotive and cause said device to operate.

Should the trainman desire to signal the engineman, the trainman operates the lever 39 of the switch device 8 to move the contact 45 into connecting engagement with the contact terminals 47 and 48, thus closing the circuit through the engineman's signal indicating device 5 and also through the signal indicating device 9, so that both devices will operate to sound the signal initiated by the trainman.

Should the switch device 58 be in position to open the circuit through the signal indicating device to the train wire 13, and the trainman desires to receive a signal from the engineman, the trainman operates the switch device 8 so that the contact 45 connects the contact terminals 47 and 49, so that, when the engineman operates the switch device 4 to connect the train wire 13 to ground 36 the circuit through the signal indicating device 9 will be completed as will the circuit through the signal indicating device 5 and both signals will operate to sound the signal from the engineman.

It will here be noted that in signalling on the train, the rectifiers 27 and 57 prevent the flow of current from one source of current to the other, so that if one source of current is of greater voltage than the other, no damage can be done to the source having the lowest voltage. Current supplied to the train wire 13 from the battery 10 and direct current generator 7 will not pass through the condenser 70 so that the magnet 68 of the magnet valve device will remain deenergized.

When the brake valve device 1 is operated to emergency position, as shown in Fig. 2, fluid under pressure from the main reservoir 2 is supplied to the piston chamber 19 of the emergency switch device 3 through pipe and passage 16, chamber 15 in the brake valve device, a port 78 in the rotary valve 17 and a passage and pipe 79. With the brake valve device in this position, the brake pipe 14 is vented to the atmosphere in the usual manner through pipe and passage 77, a cavity 80 in the rotary valve 17 and a passage 81.

Fluid under pressure supplied to the chamber 19 causes the emergency switch piston 20 to move upwardly against the pressure of the spring 25, operating the connector 21 into contact with the contact terminals 23 and 24, thus closing the circuit through the direct current generator 6, magnet 68 and ground.

With the circuit thus closed and current flowing through the circuit, the magnet 68 of the magnet valve device 12 is energized causing the valve 72 to unseat against the pressure of the spring 82 contained in the valve chamber 73, thus establishing communication through which fluid under pressure in the chamber 74 supplied from the brake pipe 14, flows to the valve chamber 73 and from thence to the piston chamber 60 in the vent valve device 11.

The pressure of fluid thus supplied to the chamber 60 causes the vent valve piston 63 to move toward the left against the pressure of a spring 83 contained in the valve chamber 64, unseating the valve 63 from the seat ring 65.

With the valve 63 unseated, fluid under pressure from the brake pipe 14 is released to the atmosphere by way of valve chamber 64, past the unseated valve 63 and around the fluted stem 62.

When each car of a train is provided with a magnet valve device 12 and a vent valve device 11, these devices throughout the length of the train, will operate simultaneously and thus cause all of the usual triple valve devices (not shown) to operate to emergency positions to effect an emergency application of the brakes substantially simultaneously on each car.

When the rear car only, of a train is provided with the magnet valve device 12 and vent valve device 11, fluid under pressure will be vented from the brake pipe 14 at the rear of the train at the same time as the brake pipe is vented at the front end of the train through the brake valve device 1, thus causing all of the triple valve devices on the train to operate promptly to effect an emergency application of the brakes.

In the present embodiment of the invention there are no means provided in the brake valve device for venting the piston chamber 19 in the emergency switch device when the brake valve device 1 is in release or running position but this chamber is vented to the atmosphere through a port 84 through the piston 20, a passage 85 through the wall 22 of the casing and an atmospheric passage 86.

When the brake valve device 1 is operated to release position to release the brakes after an emergency application, and the piston chamber 19 in the emergency switch device 8 vented to the atmosphere as just described, the pressure of the spring 25 moves the piston 20 to its lowermost position, causing the connector 21 to be moved out of contact with the contact terminals 23 and 24, thus opening the electric circuit through the magnet 68 of the magnet valve device 12, thus deenergizing said magnet. With the magnet 68 thus deenergized, the pressure of the spring 82 causes the valve 72 to seat and close off the further supply of fluid under pressure from the brake pipe to the chamber 60 in the vent valve device 11 when said brake pipe is being recharged.

When the brake pipe 14 is completely vented to the atmosphere, the pressure of the spring 83 of the vent valve device causes the valve 63 to seal against the seat ring 65 thus closing communication from the brake pipe 14 to the atmosphere through the vent valve device. If at any time there is fluid under pressure in the piston chamber 60 when the valve 72 of the magnet valve device 12 is seated, such fluid will be discharged to the atmosphere through a port 87 through the piston 61 and around the fluted stem 62.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a combined fluid pressure brake and signal system for railway trains, the combination with a brake pipe, of a brake valve device operative to vent fluid under pressure from said brake pipe to effect an application of the brakes, a valve device operative to locally vent fluid under pressure from said brake pipe, a single train wire, means for signalling over said train wire by direct electric current, means operative upon the operation of said brake valve device to effect an application of the brakes for supplying alternating current to said train wire, and means controlled by the alternating current flowing over said train wire for controlling the operation of said valve device to locally vent fluid under pressure from said brake pipe.

2. In a combined fluid pressure brake and signal system for railway trains, the combination with a brake pipe, of a brake valve device operative to vent fluid under pressure from said brake pipe to effect an application of the brakes, a valve device operative to locally vent fluid under pressure from said brake pipe, a single train wire, means for signalling over said train wire by direct electric current, means operative upon the operation of said brake valve device to effect an application of the brakes for supplying alternating current to said train wire, means connected to ground and to said train wire operative by alternating current for controlling the operation of said valve device, and a condenser interposed between said train wire and last mentioned means.

3. In a combined fluid pressure brake and signal system for railway trains, the combination with a brake pipe, of a brake valve device operative to vent fluid under pressure from said brake pipe to effect an application of the brakes, a valve device operative by fluid under pressure to locally vent fluid under pressure from said brake pipe, a single train wire, means for signalling over said train wire by direct electric current, means operative by fluid under pressure upon the operation of said brake valve device to vent fluid under pressure from said brake pipe for supplying alternating current to said train wire, and means controlled by the alternating current flowing over said train wire for supplying fluid under pressure from said brake pipe to said valve device for controlling the operation of said valve device to vent fluid under pressure from said brake pipe.

4. In a combined fluid pressure brake and signal system, the combination with a brake pipe, of a brake valve device operative to vent fluid under pressure from said brake pipe to effect an emergency application of the brakes, means controlled by an alternating electric current for locally venting fluid under pressure from the brake pipe, a single train wire, an electric circuit controlled by said brake valve device for controlling the operation of said means, means controlled by a direct electric current for indicating a signal, and a circuit for the signal means controlled by means independent of said brake valve device for controlling the operation of said signal means, said train wire being common to both of said circuits.

In testimony whereof I have hereunto set my hand this 14th day of May, 1929.

CLYDE C. FARMER.